United States Patent [19]
Grove, Jr. et al.

[11] 3,801,870
[45] Apr. 2, 1974

[54] TRANSIENT VOLTAGE LIMITER FOR SERIES CAPACITORS

[75] Inventors: Louis C. Grove, Jr.; John E. Harder; Richard D. Kennon; James N. Santilli, all of Bloomington, Ind.

[73] Assignee: Westinghouse Electric Corporation, Pittsburgh, Pa.

[22] Filed: Mar. 6, 1973

[21] Appl. No.: 338,490

[52] U.S. Cl. .............................. 317/12 A, 317/11 A
[51] Int. Cl. ............................................. H02h 9/06
[58] Field of Search ..... 317/12 R, 12 A, 12 B, 11 A

[56] References Cited
UNITED STATES PATENTS
3,335,362  8/1967  Cuttino .......................... 317/12 R
3,385,941  5/1968  Marbury ......................... 317/12 R
3,255,382  6/1966  Wolf .............................. 317/12 R Primary Examiner—James D. Trammell
Attorney, Agent, or Firm—G. H. Telfer

[57] ABSTRACT

A series capacitor installation having means for limiting transient voltages occurring upon reinsertion of the capacitor in the line after it has been bypassed by its protective equipment. For this purpose a resistor is placed in parallel with the capacitor during reinsertion, and means are provided for connecting the resistor in the circuit immediately upon bypassing the capacitor and for disconnecting the resistor at a predetermined time after the bypass has been removed.

10 Claims, 4 Drawing Figures

TRANSIENT VOLTAGE LIMITER FOR SERIES CAPACITORS

BACKGROUND OF THE INVENTION

The present invention relates to series capacitor installations in high voltage alternating current transmission lines, and more particularly to the limitation or reduction of the transient voltage associated with reinsertion of the capacitor after it has been bypassed by operation of the protective equipment.

Capacitor banks are connected in series in high voltage transmission lines to compensate a desired part of the inductance of the line in order to raise the stability limit, or to control the load division between parallel lines, or for other purposes. Since such capacitors are in series in the line they are subject to dangerous overvoltages in case of a fault on the line or other excess current conditions such as may result from switching surges. Protection against such overvoltages must be substantially instantaneous and for this reason series capacitors are usually protected by spark gaps connected across the capacitor bank or across individual series segments of the bank. The protective gaps arc over and bypass the capacitors substantially instantaneously upon the occurrence of a predetermined overvoltage. A bypass switch is usually provided in parallel with each gap for backup protection and for bypassing the capacitor in response to other abnormal conditions or to permit inspection and maintenance of the capacitors. Systems of this general type are well known and are shown, for example, in U.S. Pats. to Cuttino, No. 3,335,362 and Marbury, No. 3,385,941.

As indicated above, the protective gap bypasses the capacitor in response to a predetermined overvoltage. When the overvoltage has passed or the line current has returned to or near its normal value, the bypass is removed by extinguishing the arc in the gap, or by opening the bypass switch if it has operated, so as to reinsert the capacitor in series in the line. When the bypass is thus removed, transient currents occur at frequencies below the system frequency, and direct current transient currents also occur due to charging and discharge of the capacitors. These reinsertion transient currents result in a high transient voltage across the capacitor which is undesirable and may cause unwanted operation of the protective gap. This has been avoidable heretofore only by setting the gap for an undesirably high overvoltage level, with possibly harmful overstressing of the capacitor, or by adding series sections and gaps to the capacitor bank so as to reduce the capacitive reactance across each gap. This of course greatly increases the cost of the installation and is highly undesirable.

SUMMARY OF THE INVENTION

In accordance with the present invention the reinsertion transient voltage described above is limited, or reduced to an acceptable level, by means of a resistor of proper value connected across the capacitor during reinsertion. In order to make the size and cost of such a resistor practical and to avoid continuous loss in the resistor, it is preferably switched into the circuit only during the reinsertion period when it is needed. This is done by providing control means for closing the resistor switch to connect it across the capacitor in response to establishment of the bypass and by opening the switch at a predetermined time after the bypass is removed. In order to increase the effectiveness of the voltage limiting action and to reduce the thermal duty on the resistor a nonlinear resistor is preferably used, and the resistor may be divided into two or more parallel sections which are simultaneously connected into the circuit and disconnected sequentially at different times after removal of the bypass in order to minimize transients which may be caused by switching the resistor out of the circuit.

BRIEF DESCRIPTION OF THE DRAWINGS

The invention will be more fully understood from the following detailed description, taken in connection with the accompanying drawings, in which.

DESCRIPTION OF THE PREFERRED EMBODIMENT

Figure 1:
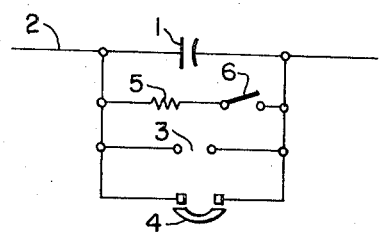
FIG. 1 is an elementary diagram illustrating the principles of the invention.

There is shown in FIG. 1 a simple diagram illustrating one phase of a typical series capacitor installation having a capacitor 1 connected in series in a high voltage alternating current transmission line 2. It will be understood that the capacitor 1 represents a high voltage capacitor bank consisting usually of many individual capacitor units connected in a suitable series-parallel arrangement to obtain the desired capacitive reactance and current capacity. Such banks are frequently divided into a number of series-connected segments and the capacitor 1 is intended to represent such an installation. The term "capacitor" as used herein therefore includes capacitor banks having any number of suitably connected individual capacitor units, or any combination of capacitor units connected together, as well as the individual units themselves. It will be also understood that each phase of a three-phase line will have identical series capacitors and protective equipment, although only one phase has been illustrated in each of the figures.

The capacitor bank 1 is protected against overvoltages by a spark gap device 3, as described above, which is connected across the capacitor 1 so as to bypass it substantially instantaneously upon the occurrence of a predetermined overvoltage for which the gap 3 is set. A bypass switch 4 is also provided connected across the gap 3 and the capacitor 1 to provide backup protection, and to enable the capacitor to be bypassed in response to other undesirable conditions or for the purpose of inspection or maintenance. The bypass switch 4 may be controlled by any suitable control system such as those shown in the patents mentioned above or any other suitable system.

In the operation of such a protective system, the gap 3 arcs over to protect the capacitor upon the occurrence of a predetermined overvoltage, and when the overvoltage condition has passed and the line current has returned to near its normal value, the bypass is removed by extinguishing the arc in the gap 3 or by opening the bypass switch 4 if it has operated. Removal of the bypass to reinsert the capacitor 1 in the line results in relatively high transient voltages, as discussed above, which may be high enough to dangerously overstress the capacitor or to cause restriking of the arc in the gap 3, both of which should be avoided. In accordance with the present invention it has been found that these transient voltages can be limited and greatly reduced by the use of a resistor 5 of proper size connected across the capacitor 1. The proper value of the resistor 5 can best be determined by studies of the complete system, which make it possible to optimize the value of the resistor either from the standpoint of capacitor protection or from the standpoint of the overall system effect. The resistor 5 may be a linear resistor and the resistance then will usually be such that the time constant of the resistor-capacitor circuit is not more than several cycles of the system frequency. It is frequently preferable, however, to utilize nonlinear resistors in order to reduce the thermal duty on the resistor as well as reducing the transient current occurring when the resistor itself is disconnected. It has been found that the optimum value for a nonlinear resistor is usually in the range of two to four times the capacitive reactance of the capacitor across which the resistor is connected, the resistance being determined at a voltage corresponding to the maximum allowable post reinsertion transient voltage. The use of a nonlinear resistor is usually desirable as it provides more effective voltage limiting action as well as reducing the energy input to the resistor itself because of the change in the value of resistance as the voltage acros sthe capacitor changes.

In order to reduce the required thermal capacity of the resistor to keep its size and cost within practical limits, and to avoid continuous energy loss in the resistor, it is desirable to switch it into the circuit only during the time when it is needed. For this purpose, the resistor is preferably connected through a switch 6 which is normally open as shown in FIG. 1. The preferred operation is to close the switch 6 immediately upon operation of the gap 3 to establish the bypass, so that the resistor is in the circuit in preparation for reinsertion of the capacitor. When the bypass is removed, as by extinguishing the arc in the gap 3, the resistor is already across the capacitor and is effective to limit the transient overvoltage due to the reinsertion of the capacitor. The switch 6 is then opened after a suitable time delay after removal of the bypass, which may for example be of the order of three to six cycles, In this way a very effective limitation of the transient overvoltage is obtained and the resistor is switched into the circuit only when it is needed so that the necessary size and cost of the resistor are kept within reasonable limits.

A control circuit capable of operating in the manner described above is shown diagrammatically in FIG. 2. As there shown two capacitor segments 7 are provided connected in series in the line 2, each segment including a capacitor bank 1 with protective gap 3 and bypass switch 4 as described above. A current limiting reactor 8 may be connected in series with each gap in the usual manner. In the embodiment illustrated in FIG. 2 each of the resistors 5 is divided into a plurality of parallel sections, two such sections 5a and 5b being shown although more than two sections may obviously be utilized. Each section of the resistor is connected across the capacitor 1 by its own switch 6a and 6b, respectively. A current transformer 9 is connected in the circuit of each gap 3 and a relay or control means generally designated 10 is connected to be actuated by the current transformer 9 and thus to respond to current in the gap circuit. The control means 10 is connected to actuate the switches 6a and 6b, as indicated by the dotted connection 11.

Figure 2:
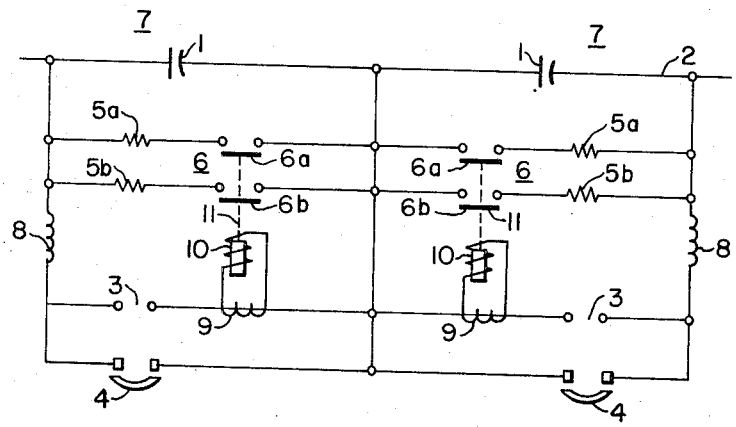
FIG. 2 is a schematic diagram of a control system embodying the invention.

The operation of this control system is essentially as described above. Upon the occurrence of an overvoltage across the capacitor 1 of either segment, the corresponding gap 3 arcs over to protect the capacitor. The transformer 9 responds to the current in the gap circuit to actuate the control means 10 to close the switches 6a and 6b substantially instantaneously upon the occurrence of arcing in the gap 3, so that the resistors 5a and 5b are connected in the circuit immediately upon establishment of the bypass across the capacitor 1. Upon removal of the bypass by extinguishing the arc in the gap 3, current flow through current transformer 9 ceases and the control 10 operates to open the switches 6a and 6b after a predetermined time delay. The action of switching the resistors out of the circuit will of course cause a transient to occur which can be minimized by switching the resistor out in steps. The resistor in FIG. 2 is divided into two sections for this purpose, although more than two sections could be used if desired, and the switches 6a and 6b are preferably opened sequentially at different times after the bypass has been removed. Thus for example the switch 6a might be opened with a time delay of three cycles and the switch 6b with a delay of six cycles after current ceases to flow in the gap circuit.

It will be seen that the current transformer 9 is deenergized and switches 6a and 6b opened upon the cessation of current through the gap 3. It may happen that the bypass switch 4 will close if, for example, the arc in the gap 3 is not extinguished in some predetermined time, or if some other undesirable condition exists. In this event, the current through the gap 3 is of course interrupted and the switches 6a and 6b are opened although the capacitor will remain bypassed by the switch 4. When the switch 4 is then reopened to reinsert the capacitor 1 in the line, a sufficient transient voltage may occur to cause the gap 3 to arc over. If this occurs, the switches 6a and 6b are closed and then reopened after reinsertion of the capacitor in the manner described above. If the capacitor voltage or the line current are insufficient, however, ot cause the gap to arc over when the switch 4 is opened, then the switches 6a and 6b will remain open but in this case the transient occurring as a result of opening switch 4 is relatively low and insufficient to require the resistors 5. Thus whether the capacitor is bypassed by the gap 3 or by the switch 4, the operation is such that the resistor is switched into the circuit when needed and removed when it is not needed.

Figure 3:
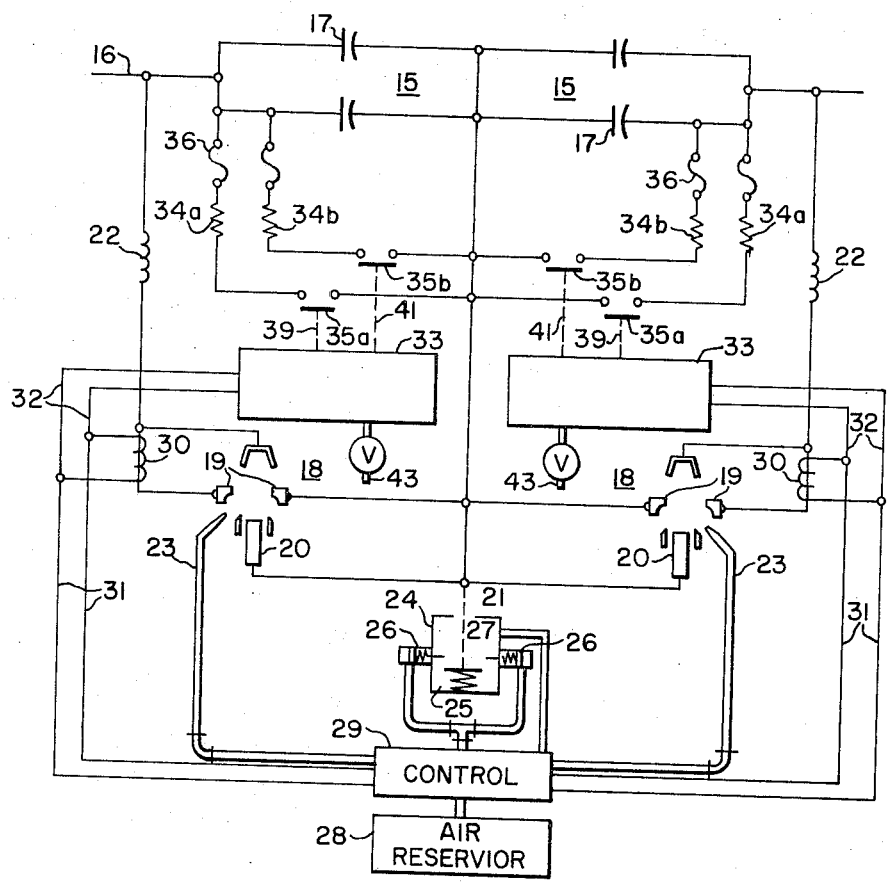
FIG. 3 is a diagram of a series capacitor installation including a control system embodying the present invention.
Figure 4:
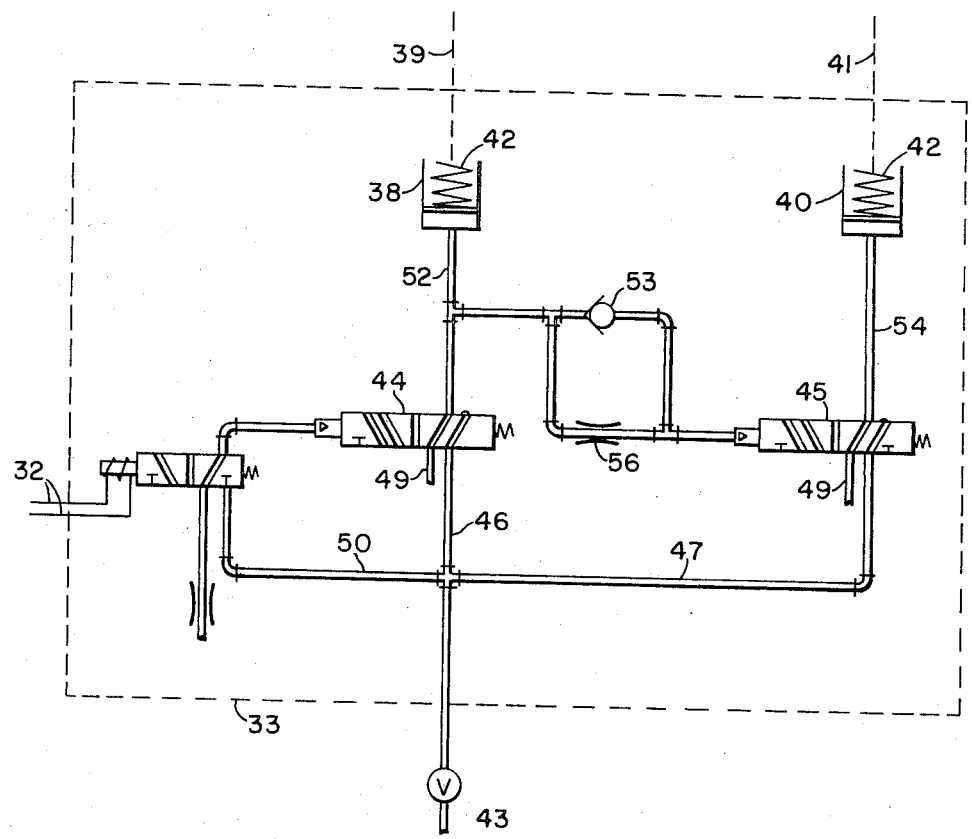
FIG. 4 is a detail diagram of a portion of the system of FIG. 3.

FIGS. 3 and 4 show an actual control system for a series capacitor installation which operates in the manner described in connection with the illustrative diagram of FIG. 2. The system of FIG. 3, is applied to a series capacitor installation consisting of two capacitor segments 15 connected in series in a high voltage transmission line 16, only one phase of the line and its associated equipment being shown. Each segment 15 consists of a suitable number of individual capacitors or capacitor banks 17 suitably connected in parallel or series-parallel. Each of the capacitor segments 15 is protected by a combined spark gap and bypass switch 18 of the type disclosed in the above-mentioned Marbury U.S. Pat. No. 3,385,941. As more fully described, each of these devices has fixed electrodes 19 constituting a protective spark gap device, and has fixed and movable switch contacts 20 actuated by a common operating mechanism diagrammatically indicated at 21. The gap electrodes 19 of each of the devices 18 are connected, as shown, across the corresponding capacitor segment 15 in series with a current limiting reactor 22. The switch contacts 20 of each device 18 are connected to bypass both the capacitor and the gap between the electrodes 19 when the switch contacts are closed. An air blast is provided for each of the devices 18 through a suitable conduit and nozzle indicated at 23, also as described in the above-mentioned patent.

The bypass switch devices 18 may be actuated and controlled in any desired manner, and control systems such as those disclosed in the previously mentioned patents may be utilized. As shown somewhat diagrammatically in FIG. 3, however, it is preferred to utilize the type of system disclosed and claimed in a copending application of T.M. Ringler et al., Ser. No. 337,243 filed Mar. 1, 1973, and assigned to the assignee of this invention. As there disclosed the common operating mechanism 21 of the two protective devices 18 is actuated by means of a pneumatic cylinder 24. The cylinder 24 is connected to the actuating mechanism 21, indicated diagrammatically by the dotted connection, which is spring biased by a spring 25 to the closed position of the switches 20. Normally the switches are held in the open position by pneumatic latching cylinders 26 each of which actuates a latch 27 which is held by pneumatic pressure in the latching position shown in the drawing against spring biasing means in the latching cylinders, as more fully described in the above mentioned copending application.

Air for operation of the pneumatic cylinders and also for supplying an air blast to the conduits 23 is provided from an air reservoir 28 through a control system 29. As indicated above, the control system 29 is preferably of the type disclosed and claimed in the above-mentioned copending application, alhough any suitable control system might be used. In any case, the control system responds to various selected undesirable or abnormal conditions such as overvoltage, unbalance or overheating of the capacitor bank, and other predetermined conditions, to release the air pressure in the latching cylinders 26 so as to retract the latches 27 and permit the bypass switches 20 to close. These functions may be performed in any desired manner by any desired means and are not a part of the present invention.

For the purpose of overvoltage protection of the capacitors 17, the spark gap electrodes 19 are set to arc over at a predetermined voltage. A current transformer 30 is provided in each gap circuit and is connected by leads 31 to the control 29 and by leads 32 to a resistor control 33. Upon arcing of the gap 19 to bypass the capacitors 17 in response to an overvoltage, current flows in the gap circuit and the current transformer 30 responds to actuate both the control 29 and the resistor control 33. The control 29 operates in the manner known in the art, or as described in the above mentioned copending application, to effect closure of the switches 20 if the arc in the gap 19 is not extinguished to remove the bypass within a predetermined time. If the arc is so extinguished by subsidence of the overvoltage, the switches 20 remain open.

As described above, interruption of the bypass to reinsert the capacitors in the line results in undesirable transient voltages, and these voltages can be limited or minimized by a suitable resistor connected across the capacitors 17. A resistor 34 is therefore provided for each of the segments 15. The resistors are preferably divided, as shown in FIG. 3, into two parallel sections 34a and 34b, although if desired more than two sections could be utilized. Each of the resistors 34a and 34b is connected across the corresponding capacitor segment 15 by a switch 35a and 35b, respectively, preferably through fuses 36. The switches 35a and 35b are operated by the control means 33 in response to signals from the current transformer 30 in the manner described above in connection with FIG. 2.

The control means 33 is shown in detail in FIG. 4 and operates to directly actuate the switches 35a and 35b which may be any suitable type of switch such as vacuum switches. Each switch is operated by a suitable actuator such as a pneumatic cylinder. The cylinder 38 is connected to the switch 35a, as indicated by the dotted connection 39, and a cylinder 40 is similarly connected to the switch 35b, as indicated by the dotted connection 41. In each case, the switches are held open by springs 42 in the respective cylinders and are closed by applying pneumatic pressure which moves the switches to closed position against the force of the springs 42. An air supply for the operation of the cylinders 38 and 40 is provided through a conduit 43, which may be supplied from the reservoir 28 or from any other suitable source of air under pressure. The application of pneumatic pressure to the cylinders 38 and 40 is controlled by valves 44 and 45, respectively, which control the flow of air to the cylinders from conduits 46 and 47, respectively, and the exhaust of air from the cylinders. The valves 44 and 45 in turn are controlled by a solenoid valve 48 which is actuated by current from the current transformer 30 through the leads 32.

Under normal conditions, with no current in the gap circuit, the valves are in the position shown in FIG. 4 in which both cylinders 38 and 40 are connected to exhaust lines 49 by their respective control valve so that the switches are held in open position by the springs 42. Upon the occurrence of an overvoltage on the capacitor segment 15 with resultant arcing over of the gap 19, current flows in the gap circuit and a current signal is received from the transformer 30 through the leads 32. This moves the solenoid valve 48 to its actuated position in which the conduit 50 is connected to the conduit 51 so that air flows from the supply line 43 through conduits 50 and 51 to the valve 44 and actuates that valve. In the actuated position of the valve 44 the conduit 46 is connected to a conduit 52 and thus to the cylinder 38 and through a check valve 53 to the valve 45. The valve 45 is thus actuated and connects the conduit 47 to a conduit 54 and thus to the cylinder 40. Both cylinders 38 and 40 are thus actuated to move the switches 35a and 35b to closed position substantially simultaneously. The resistors 34a and 34b are thus connected across the capacitor 17 substantially instantaneously upon the establishment of the bypass.

When the overvoltage ceases and arcing of the protective gap is extinguished, or the current in the gap circuit is otherwise interrupted, the solenoid valve 48 is deenergized and returns to its position shown in FIG. 4. In this position the conduit 51 is connected to exhaust 49 through an orifice or restriction 55 which throttles the flow of air therethrough. The valve 44 is thus connected to exhaust and returns to its nonactuated position shown in the drawing, but with a time delay determined by the rate at which air is permitted to escape through the orifice 55. Thus after a predetermined time delay the valve 44 returns to its initial position connecting the conduit 52 to exhaust 49 and permitting the spring 42 to open the switch 35a to remove the resistor 34a from the circuit. The check valve 53 prevents flow of air from the valve 45 to the conduit 52 but air is permitted to exaust to the conduit 52 through an orifice 56 connected across the check valve 58. Thus an additional time delay is interposed in the exhaust of air from the valve 45 and after this further time delay the valve 45 returns to its nonactuated position and connects the conduit 54 to exhaust 49. This permits the spring 42 in the cylinder 40 to open the switch 35b and disconnect the resistor 34b from the circuit.

Thus the two parallel sections 34a and 34b of the resistor are simultaneously connected in the circuit upon establishment of the bypass around the capacitor 17, and are removed sequentially at different predetermined time delays after removal of the bypass. As explained previously, if the bypass switch 20 is closed for any reason, current flow in the gap circuit ceases and the switches 34a and 34b will be opened as described above. Upon opening the switch 20 the gap may or may not arc over, and if it does not arc over the switches will remain open as the resistors are not needed. If the gap does arc over, however, the operation will be as described to insert the resistors and then to switch them out of the circuit when the bypass is interrupted.

It should now be apparent that a means has been provided for effectively limiting or reducing the transient overvoltage that may occur on reinsertion of a series capacitor in the line. Certain specific embodiments have been shown for the purpose of illustration but it will be apparent that various modifications may be made. Thus the resistors may be either linear or nonlinear although nonlinear resistors are preferred in most cases. Similarly, the resistors may be divided into any number of sections simultaneously connected in the circuit and disconnected either simultaneously or with different time delays as described above.

The use of this voltage limiting resistor results in the prevention of dangerous overvoltages on the capacitors and permits a reduction in the number of capacitors in series in the line, or a decrease in their dielectric strength, thus reducing the cost of the installation, and may have other beneficial effects on the transmission system.

We claim as our invention:

1. In a series capacitor installation having a capacitor bank adapted to be connected in series in an alternating current transmission line, means for bypassing said capacitor bank under predetermined conditions, means for connecting a resistor across the capacitor bank upon establishment of said bypass of the capacitor bank, and means for disconnecting the resistor a predetermined time after removal of the bypass.

2. The combination of claim 1 in which said resistor is a non-linear resistor.

3. The combination of claim 1 in which a plurality of resistors are connected across the capacitor bank substantially simultaneously, and including means for disconnecting said resistors sequentially after different predetermined time delays.

4. The combination of claim 3 in which the resistors are non-linear.

5. A series capacitor installation including a capacitor bank adapted to be connected in series in an alternating current transmission line, protective means for bypassing the capacitor bank in response to predetermined abnormal conditions, means for effecting connection of a resistor across the capacitor bank in response to operation of said protective means, and means for effecting disconnection of said resistor after a predetermined time delay in response to removal of said bypass.

6. The combination of claim 5 in which said resistor is a non-linear resistor.

7. The combination of claim 5 in which said resistor comprises a plurality of individual resistors simultaneously connected in parallel across the capacitor bank and in which said disconnecting means effects disconnection of the individual resistors sequentially after different time delays.

8. The combination of claim 7 in which said individual resistors are non-linear resistors.

9. The combination of claim 5 in which said protective means is a spark gap device adapted to arc over and bypass the capacitor bank in response to a predetermined overvoltage.

10. The combination of claim 9 in which said resistor is connected across the capacitor bank in response to current flow through said gap device.

* * * * *